(No Model.)
J. A. HOUSE.
APPARATUS FOR FORMING AND SHAPING CORSETS.
No. 294,046. Patented Feb. 26, 1884.
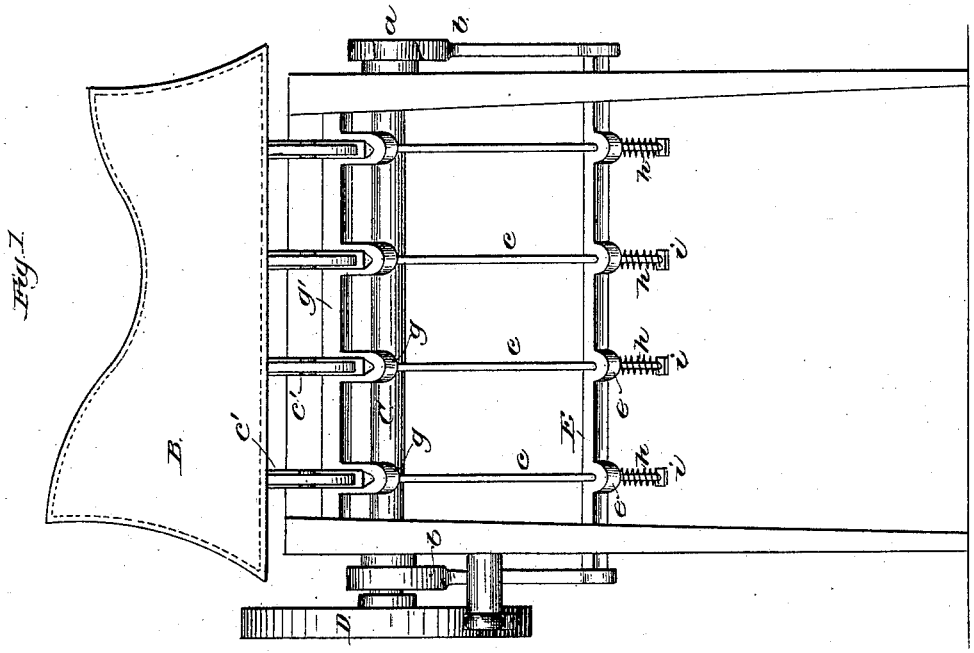
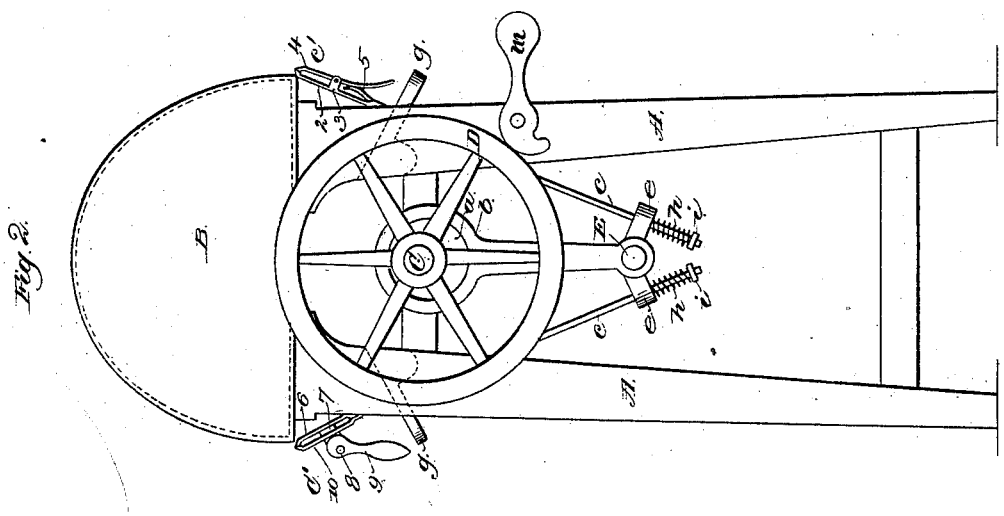
Witnesses.
John F. C. Printert
B. J. Noyes.
Inventor
James Alford House.
by Crosby & Gregory attys.

UNITED STATES PATENT OFFICE.

JAMES ALFORD HOUSE, OF BRIDGEPORT, CONNECTICUT.

APPARATUS FOR FORMING AND SHAPING CORSETS.

SPECIFICATION forming part of Letters Patent No. 294,046, dated February 26, 1884.

Application filed July 16, 1883. (No model.)

*To all whom it may concern:*

Be it known that I, JAMES A. HOUSE, of Bridgeport, county of Fairfield, State of Connecticut, have invented an Improvement in Apparatus for Shaping Corsets, of which the following description, in connection with the accompanying drawings, is a specification, like letters on the drawings representing like parts.

This invention relates to that class of shaping apparatus wherein the corset, grasped at its edges, is stretched over a form, preferably heated, and heated and made to resemble in outline the breast and waist of a person. The halves of the corset will preferably be joined together along one edge while being stretched, the opposite edges of the said halves being caught by the clamps which draw the corset over the form.

In the machine shown in United States Patent No. 265,963, heretofore granted to me, and on which the apparatus herein described is an improvement, the edges of the corset are grasped by long clamps, or the steels having the usual studs and eye-pieces are engaged by the said clamps, the strain of the said bars on the corset being measured by the force of springs.

In the present invention I have devised a series of clamps, each of which is adapted to directly engage a different portion of the corset. These clamps are carried each by an appropriate rod or clamp carrier, each carrier of the series being acted upon by a cross-head or plunger through the intervention of a spring.

My invention consists in a corset-shaping apparatus composed of a form, a series of carriers, and clamps at each side the form to grasp the edges of the corset, combined with a reciprocating cross-head or plunger to actuate the carriers, and with springs interposed between the said cross-head or plunger and the carriers, whereby the strain exerted on each carrier and its clamp is a yielding one measured by a spring.

Figure 1 is a side elevation of a corset-shaping apparatus embodying my invention; and Fig. 2, an end view thereof, the corset being omitted.

The frame-work A, of suitable shape, has mounted upon it the form B, of suitable size, shaped to resemble a natural breast, waist, and hips. The form will preferably be made hollow, so that it may be heated, and of metal so covered that it will not rust.

The shaft C, provided with a hand-wheel, D, has upon it two eccentrics, $a$, which receive about them and move the eccentric straps $b\ b$, joined at their lower ends with a cross-head or plunger, E, having toes or lugs $e$, which have holes to receive and guide the clamp-carrier $c\ c$, shown as round rods provided at their upper ends with clamps $c'$, adapted to engage the edges of the corset, preferably the eyeleted edges, and stretch the corset across and about the form as the carrier-rods are reciprocated in the lugs, and the lugs $g$ forming part of the cross-bar $g'$.

The clamps herein shown at the right of Fig. 2 are each composed of a base-piece, 2, having ears 3, which receive a pin that serves as a pivot for a jaw, 4, one end of which is acted upon by a spring, 5, the latter acting to keep the clamp closed upon the corset. The clamps shown at the left of Fig. 2 are each composed of a base, 6, having a post, 7, which is extended out through a jaw, 10, and has pivoted upon it at 8 an eccentric-headed lever, 9, by which to force the jaw and plate toward each other to clamp the edge of the corset. Neither of the clamps shown is of my invention, but are employed for various purposes; and, instead of the clamps shown, I may employ any other usual or well-known clamps. Below the ears $e$ of the cross-head or plunger E each clamp-carrier is provided with a spiral spring, $h$, which is retained upon the carrier by a nut, $i$.

I have herein shown the stretching apparatus as provided at each side the form with a series of four clamps; but a greater number of clamps may be used. The clamps at opposite sides of the form having been made to engage the edges of the corset laid over the form, the shaft is turned, causing the eccentrics and straps to depress the cross-head or plunger E, and, acting upon the springs $h$, compress them, the latter acting against the nuts $i$, moving the clamp-carriers down or away from the form, the clamps holding upon the corset, drawing the latter snugly about and fitting it to the form, molding the corset into the proper shape. The springs interposed between the nuts and cross-head E enable each clamp and clamp-carrier to move more or less, according to the shape of the corset and form; and the strain or pull of each clamp being measured by a spring, there is no danger of tearing the corset.

Instead of actuating the clamp-carriers from one common cross-head, it is obvious that I might provide the shaft C with an eccentric for each clamp-carrier and move each of the said carriers through a strap, like strap $b$, the said strap being, however, provided at its lower end with an ear, and being suitably guided so as to be moved in a right line. While the corset is drying or being held upon the form to set, the brake $m$, acting on the wheel D, prevents the shaft from turning.

Instead of eccentrics, the shaft C might be provided with a series of cams to act on levers, and the free end of each lever, provided with a hole, as is the ear $e$, would receive the clamp-carrier and act against a spring, as does the ear $e$.

I claim—

1. In a corset-shaping apparatus, a form and a series of independent clamps at each side thereof to grasp the corset, and a series of movable clamp-carriers, combined with means to actuate the said clamp-carriers, and with springs to enable the clamps and carriers to stretch the corset by a strain measured by the said springs, substantially as described.

2. The shaft C, cross-head E, or equivalent, clamp-carriers, clamps, and springs, combined with the form, to operate substantially as described.

In testimony whereof I have signed my name to this specification in the presence of two subscribing witnesses.

JAMES ALFORD HOUSE.

Witnesses:
HENRY W. GILBERT,
JAMES CARR.